US012342932B1

(12) United States Patent
Heaston et al.

(10) Patent No.: US 12,342,932 B1
(45) Date of Patent: Jul. 1, 2025

(54) ADJUSTABLE TENSIONING MECHANISM FOR STORAGE RACK (71) Applicant: Amazon Technologies, Inc., Seattle, WA (US)

(72) Inventors: Jeremy Heaston, Ashland, MA (US); Shubin Chen, Shrewsbury, MA (US)

(73) Assignee: Amazon Technologies, Inc., Seattle, WA (US)

( * ) Notice: Subject to any disclaimer, the term of this patent is extended or adjusted under 35 U.S.C. 154(b) by 407 days.

(21) Appl. No.: 17/994,806

(22) Filed: Nov. 28, 2022

(51) Int. Cl.
*A47B 57/00* (2006.01)
*B65G 1/04* (2006.01)

(52) U.S. Cl.
CPC ............ *A47B 57/00* (2013.01); *B65G 1/0471* (2013.01); *A47B 2220/0061* (2013.01)

(58) Field of Classification Search
CPC ......... A47B 57/44; A47B 57/30; A47B 57/18; A47B 57/12; A47B 57/06; A47B 57/00; A47B 2220/0061; B65G 1/00; B65G 1/026; B65G 1/0471; B65G 1/0414; B65G 1/0492; F16M 11/046; E04H 12/20; E04H 17/22; E04H 17/23
USPC ..... 414/281; 248/218.4, 219.1, 219.2, 219.3, 248/219.4, 220.31, 220.41, 220.42, 248/220.43, 223.31, 223.41, 231.9, 235, 248/241, 274.1, 276.1, 295.11, 354.1, 49; 108/158.11
See application file for complete search history.

(56) References Cited

U.S. PATENT DOCUMENTS

| 1,569,366 | A  | * | 1/1926 | Goldberg | ................ A47F 7/175 211/182 |
| 11,230,435 | B1 | * | 1/2022 | Mehta | ....................... B65G 1/10 |
| 2021/0155410 | A1 | * | 5/2021 | Takai | .................... B65G 1/1375 |
| 2021/0198037 | A1 | * | 7/2021 | Sabhnani | ................. B65G 1/10 |

* cited by examiner

*Primary Examiner* — Glenn F Myers
(74) *Attorney, Agent, or Firm* — Kilpatrick Townsend & Stockton LLP (57) ABSTRACT

A tensioning system may be implementable for a rack. A ladder upright may extend upwardly from a central area of a base of the rack and support shelves. First and second straps may extend upwardly from first and second lateral areas of the base and couple with a plate arranged along the ladder upright. The plate can include a set of vertically aligned plate-aligning apertures, and the ladder upright can include a set of vertically arranged receiving apertures. Corresponding aperture pairs can each include one from the set of receiving apertures and one from the set of plate-aligning apertures. The plate-aligning apertures may be distributed differently from the receiving apertures such that the plate is vertically moveable along the receiving apertures to change which of the corresponding aperture pairs is aligned for receiving a fastener to retain the plate in a state in which tension is present in the straps.

20 Claims, 10 Drawing Sheets

ADJUSTABLE TENSIONING MECHANISM FOR STORAGE RACK

BACKGROUND

Inventory systems, such as those in warehouses, supply chain distribution centers, airport luggage systems, and custom-order manufacturing facilities, face significant challenges in storing inventory items. As the amount of inventory stored at a single location continues to grow, inefficient utilization of system resources, including space, equipment, and manpower, can result in lower throughput, unacceptably long response times, an ever-increasing backlog of unfinished tasks, and, in general, poor system performance. In addition, especially when implemented across multiple locations and/or otherwise at large scale, any individual refinement can result in significant gains in cost-effectiveness and/or reliability of system resources.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein can relate to inventory management systems. Inventory management systems can include racks or other inventory holders that can store a variety of inventory items. The racks may be movable around a workspace by one or more robotic vehicles or other mobile drive units, for example. To counteract sway that may occur when an inventory holder is being engaged (such as during lifting by a mobile drive unit), the inventory holder may be equipped with a tensioning system.

In various examples, the tensioning system can include straps that can extend upward from lateral portions of the base of the inventory holder. The straps may extend upwardly and inwardly to attach along a central column, for example. The central column may correspond to a ladder upright from which shelves may extend in lateral directions for supporting inventory items. In use, the straps may be subject to a pre-loaded amount of tension, which may enable the straps to resist sway or oscillating of the ladder upright that may otherwise occur in response to lifting by a mobile drive unit. Resisting sway may reduce a frequency and/or magnitude of cyclical loading and may reduce a chance of failure along welded joints or other attachment interfaces along the ladder upright, for example.

The straps may attach at upper ends to a plate that can facilitate adjustment of tension in the straps. For example, during installation, a set of fasteners may be used to attach the straps at a lower end to the base and at an upper end to the plate. In use, the plate may be moved upwardly to exert a force on the straps to impart and/or upwardly adjust tension in the straps. Pushing or pulling the plate upward (e.g., a single piece) may simultaneously apply or adjust tension for multiple straps attached to the plate (e.g., attached on left and right sides of the plate).

The plate may facilitate securing the straps in a state with a suitable amount of tension present in the straps. For example, in installation, after the plate is raised to impart tension in the straps, a fastener may be inserted through the plate and into the ladder upright to hold the plate in a particular position so that the straps are retained with a corresponding suitable level of tension present in the straps.

The plate may have features that facilitate various attachment positions. For example, the plate may have a series of holes or apertures, which may be each matched or paired with a corresponding set of holes or apertures in the ladder upright. The holes in the plate and in the ladder upright may be distributed slightly differently from one another. The difference in distribution may cause different pairs of the holes to align as the plate is moved upward. For example, as the plate reaches a first height, a topmost pair of the holes may align, while lower holes remain incompletely aligned. Similarly, moving the plate up to a second height may move the topmost pair out of complete alignment and move the second highest pair into alignment, while other lower holes remain incompletely aligned. More generally, a different pair may align at each relevant height reached. In use, an installer may push the plate upward until reaching a suitable amount of tension and then may insert a rivet or other fastener into whichever pair is aligned. Inserting the fastener into whichever pair is aligned can secure the plate in that position so that the straps are retained with the corresponding suitable level of tension present in the straps.

The different alignment possibilities may account for possible variations in tolerances of strap length or other component dimensions. As an illustrative example, a strap that is precisely a specified length may reach a suitable tension upon raising the plate to a particular height, which may correspond to a position at which a pair of holes in the middle of the plate (such as a second of three pairs) will align to receive a fastener. In comparison, a strap that is 0.1% or other amount shorter than the specified length may reach a suitable tension upon raising the plate to a relatively lower height, which may correspond to a position at which a lower pair of holes (such as a third of three pairs) below the middle of the plate will align to receive a fastener. As another comparison a strap that is 0.1% or other amount longer than the specified length may reach a suitable tension upon raising the plate to a relatively higher height, which may correspond to a position at which an upper pair of holes (such as a first of three pairs) above the middle of the plate will align to receive a fastener. Overall, variations in tolerances of the straps or other components of the inventory holder may be accounted for by pushing the plate upward to impart tension until at least one of the pairs of holes lines up sufficiently to fit a fastener and to secure the plate in the position in which the straps are retained with suitable tension present in the straps.

In some embodiments, a tensioning tool can be utilized to adjust the position of the plate. The tensioning tool may have a mount that allows attachment of the tool to the ladder upright. For example, the mount may include a hook (e.g., to hang from an upper ledge, lip, or projection), spring-loaded pins (e.g., to engage holes in the side or other area of the ladder upright), or other feature to attach at a fixed position on the ladder upright. In such an attached position, a coupler of the tool may engage the plate, such as via a slot that may receive the plate and/or pins that may insert into the plate. The tool may have a movable portion that is drivable by a torque screwdriver or other device capable of operating by an amount (e.g., by a measurable amount) to continue pulling the plate until a suitable amount of tension is imparted in the straps.

The tensioning tool can raise the plate to a position where suitable tension is present in the straps. Such positioning may cause one of the pairs of holes to align so that one hole in the plate is lined up with one hole in the ladder upright and suitably positioned for securing by inserting a rivet or other fastener through the aligned holes. In this fashion, the rivet or other fastener may secure the plate in the position in which a suitable amount of tension is imparted to the straps. For example, the tension may be in a range that is sufficient to present sway or oscillation of the ladder upright in use and may also be suitably low to avoid pulling up corners of the base into a bowl shape that may be non-conducive to maintaining the base in a flat arrangement for facilitating engagement with the mobile drive unit.

In various embodiments, an upper set of straps and a lower set of straps may be included. For example, the lower straps may provide additional stability against warping of the ladder upright in response to tension applied by the upper set of straps.

Figure 1:
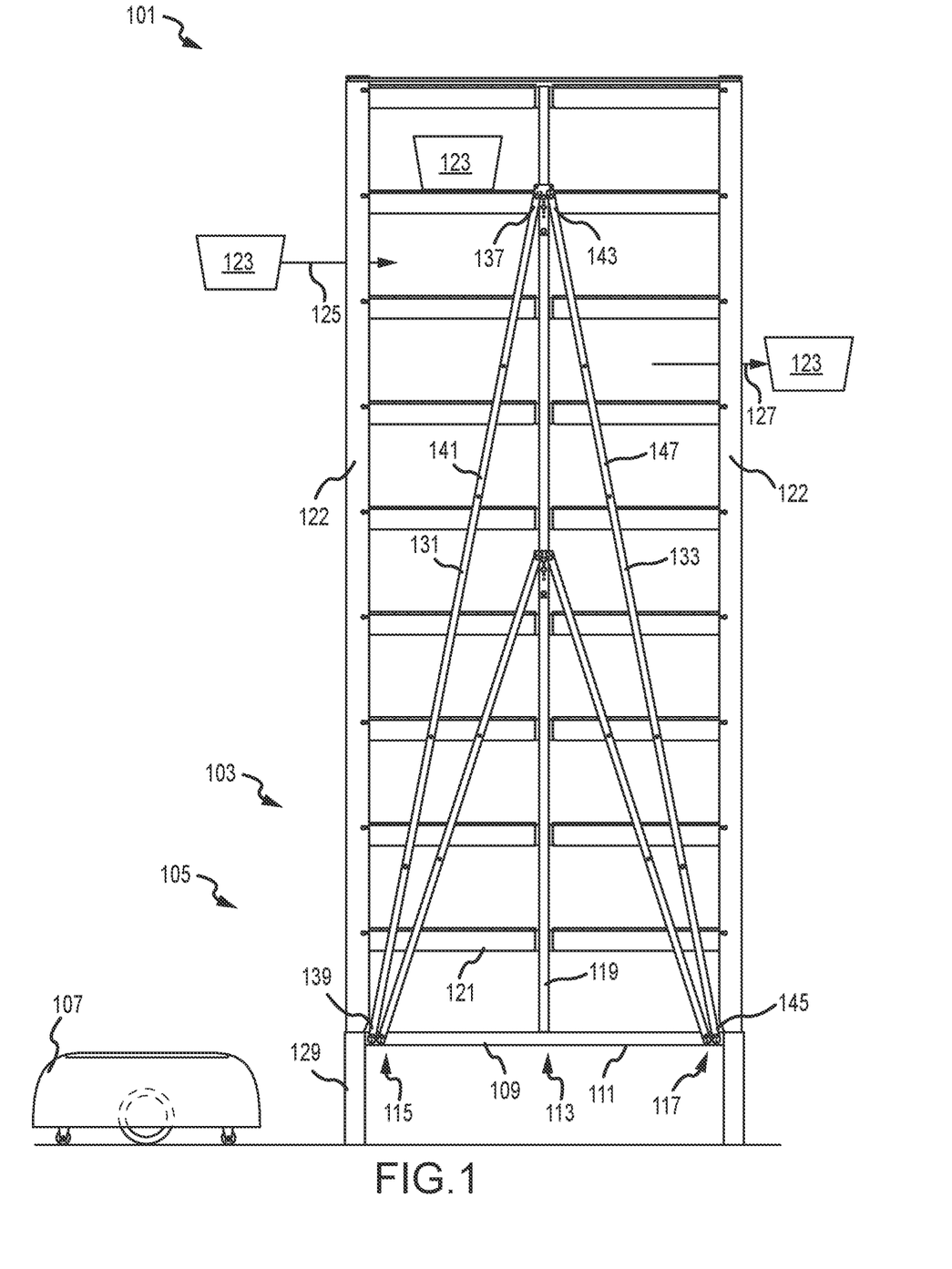
FIG. 1 illustrates features of an inventory management system with a tensioning system implemented, in accordance with various embodiments.

Referring now to the figures, FIG. 1 illustrates a system 101 (which may be an inventory management system, for example) with a tensioning system 103 implemented. The system 101 is depicted as including an inventory holder 105 and a mobile drive unit 107 although more, fewer, or other elements may additionally or alternatively be included. The tensioning system 103 can include at least some features that are included in and/or coupled with the inventory holder 105.

The inventory holder 105 can correspond to a rack or other structure suitable for holding inventory. The inventory holder 105 can include a base 109. The base 109 can include a bottom surface 111 engageable by the mobile drive unit 107.

The base 109 can include different regions or areas. For example, the base 109 can include a central area 113, which may be positioned between a first lateral area 115 (e.g., as at left in FIG. 1), and a second lateral area 117 (as at right in FIG. 1). The first lateral area 115 and the second lateral area 117 may be arranged along a side of the inventory holder 105. For example, the first lateral area 115 may be arranged along a front of the inventory holder, and the second lateral area 117 may be arranged along the rear of the inventory holder 105, although any suitable arrangement relative to a front, rear, or other reference point of the inventory holder 105 may be utilized.

The inventory holder 105 can include a ladder upright 119. The ladder upright 119 may be anchored in or along the central area 113 of the base 109. The ladder upright 119 may extend upwardly from the base 109. The ladder upright 119 may include or be coupled with suitable brackets or other structure for supporting other features. For example, a set or plurality of shelves 121 may be coupled with the ladder upright 119. To this end, the ladder upright 119 may correspond to a shelving stem.

The shelves 121 may be arranged above the base 109. The shelves 121 may be supported by the ladder upright 119. For example, the shelves 121 may be welded or otherwise suitably connected to the ladder upright 119. The ladder upright 119 may be positioned so that the shelves 121 extend laterally from the ladder upright 119.

Columns 122 or other structure that may support the shelves 121 at suitable positions along the inventory holder 105. For example, columns 122 are shown at the corners of the inventory holder 105, although the columns 122 could be positioned at any suitable location for providing support to the shelves 121 and or structure for the overall inventory holder 105.

In use, the shelves 121 can support inventory items 123. The inventory items 123 may be stored on the shelves 121, for example. The inventory items 123 may correspond to containers that in turn contain objects that may be utilized within the inventory system 101, although in some aspects, the inventory items 123 may correspond directly to objects used within the inventory system 101 other than containers.

The shelves 121 and/or other elements of the system 101 may be arranged so that inventory items 123 may be placed onto shelves (as at arrow 125) and/or removed from the shelves (as at arrow 127). For example, the columns 122, the ladder upright 119, and/or other structure of the inventory holder 105 may be arranged to provide suitable spaces or openings into which inventory items 123 may be stowed or out of which inventory items 123 may be removed in use of the inventory management system 101. The spaces or openings may correspond to slots, cubbies, or other forms of berths. In some embodiments, items 123 may be removed from multiple sides of the inventory holder 105. For example, in FIG. 1, the items 123 are shown as movable into or out of either a front side (e.g., as at arrow 125) or a rear side of the inventory holder 105 (e.g., as at arrow 127).

The inventory holder 105 may include a set of legs 129. The legs 129 may extend downwardly from the base 109. The legs 129 may be spaced apart from one another to facilitate passage of the mobile drive unit 107 between at least some of the legs 129. Such spacing may allow the mobile drive unit to reach a position beneath the base 109 at which the mobile drive unit 107 may engage with the bottom surface 111 of the base 109 to lift the inventory holder 105 for transport within a workspace. For example, the mobile drive unit 107 may be capable of moving the inventory holder 105 among different storage areas, stations, and/or other locations within a workspace. One illustrative example may include an inventory field in which inventory holders 105 are retained until ready for accessing of inventory items 123, at which point the inventory holder 105 may be transported by the mobile drive unit 107 to a suitable station or other location for access to the inventory items 123 and/or receipt of additional inventory items 123.

In use, the tensioning system 103 may provide stabilization among the ladder upright 119 and the base 109 and/or among other structures of the inventory holder 105. For example, the tensioning system 103 may include elements that may mitigate against or counteract a sway or oscillation of the ladder upright 119 that may otherwise occur in response to lifting by the mobile drive unit 107 in the absence of respective features of the tensioning system 103. The tensioning system 103 may also be implemented in a fashion that avoids overly pulling or distorting the base 109 and may thereby avoid deflection of the base 109 that may otherwise move away from a flat surface that is conducive to engagement by the mobile drive unit 107. The tensioning system 103 may include any suitable combination of features to accomplish the functions or purposes of the tensioning system 103. Some examples of features that may be included in the tensioning system 103 are shown in FIG. 2, for example.

Figure 2:
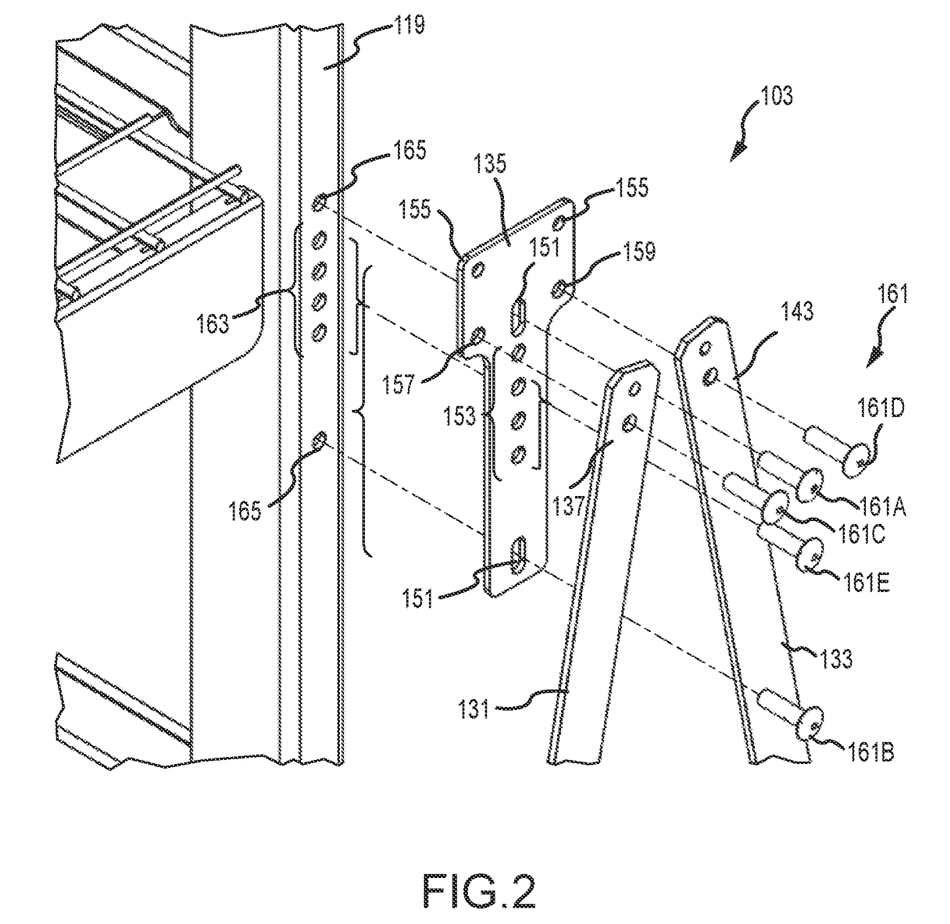
FIG. 2 illustrates an exploded view of various examples of components that may be included in the tensioning system of FIG. 1, in accordance with various embodiments.

FIG. 2 illustrates an exploded view of various examples of components that may be included in the tensioning system 103. In FIG. 2, the tensioning system is shown with at least a first strap 131, a second strap 133, and a plate 135, although fewer, more, or other features may be included.

The first strap 131 and the second strap 133 may each correspond to elongate members. Each may include respective portions. For example, as may be best seen with reference back to FIG. 1, the first strap 131 may include a first upper anchor portion 137, a first lower anchor portion 139, and a first elongate body portion 141 that may extend between the first upper anchor portion 137 and the first lower anchor portion 139. Similarly, the second strap 133 may include a second upper anchor portion 143, a second lower anchor portion 145, and a second elongated body portion 147 that may extend between the second upper anchor portion 143 and the second lower anchor portion 145.

In use, the first strap 131 and the second strap 133 may be attachable by suitable fasteners or other attachment techniques relative to other components of the system 101. For example, the first lower anchor portion 139 may be couplable or coupled with or along the first lateral area 115 of the base 109, and the second lower anchor portion 145 may be coupleable or coupled with or along the second lateral area 117 of the base 109. The first upper anchor portion 137 and the second upper anchor portion 143 in use may each be anchored to an upper region of the ladder upright 119, such as via a plate 135. Although respective anchoring portions of the first strap 131 and the second strap 133 are shown in FIG. 1 as positioned along or adjacent strap ends, arrangements herein are not so limited and may include arrangements in which at least a portion extends beyond the anchoring portion instead of being located at an end or terminus per se.

Referring again to FIG. 2, the plate 135 can include various features that can allow interaction with other elements of the tensioning system 103. As may be best seen in FIG. 2, the plate 135 may be generally T-shaped or include a T-shape, for example with a stem of the T shape extending downward and wings of the T-shape extending laterally. The plate 135 can include various attachments features, which may correspond to openings (e.g., through-holes or recesses) or other attachment surfaces. The plate is shown with positioning apertures 151, plate-aligning apertures 153, tool-engaging apertures 155, a first strap engaging aperture 157, and a second strap engaging aperture 159, although fewer, more, or other forms of features may be included.

Suitable fasteners 161 may be included to facilitate engagement among features of the tensioning system 103. The fasteners 161 may correspond to rivets, bolts, weldments, or any other suitable form of mechanical fastener. The fasteners 161 in FIG. 2 are depicted as including a first plate positioning fastener 161A, a second plate positioning fastener 161B, a first strap attaching fastener 161C, a second strap attaching fastener 161D, and an alignment fastener 161E, although more, fewer, or other fasteners may be utilized.

The plate 135 may be positionable or installable relative to features present on and/or arranged along the ladder upright 119. For example, features may be included in the ladder upright 119 or included in structure attached to the ladder upright 119. Examples may include a set of receiving apertures 163, and a set of support apertures 165.

Generally, in assembly, features of the tensioning system 103 may be installed and/or coupled to other suitable structures for connection. Features can be sized and spaced to facilitate alignment for coupling together, such as by fasteners 161. As one example, the positioning apertures 151 in the plate 135 may be suitably sized to match up or align with the support apertures 165 of the ladder upright 119, e.g., such that the first plate positioning fastener 161A may extend through an upper positioning apertures 151 in the plate 135 and an upper support aperture 165 in the ladder upright 119 and/or such that the second plate positioning fastener 161B may extend through a lower positioning apertures 151 in the plate 135 and a lower support aperture 165 in the ladder upright 119. As another example, the first strap attaching fastener 161C may extend through the first strap engaging apertures 157 in the plate 135 and connect with the first upper anchor portion 137 of the first strap 131. Similarly, the second strap attaching fastener 161D may extend through the second strap engaging aperture 159 in the plate 135 and connect with the second upper anchor portion 143 of the second strap 133. As a further example, the alignment fastener 161E may extend through one of the plate-aligning apertures 153 in the plate and into one of the receiving apertures 163 of the ladder upright 119. Generally, corresponding apertures for the plate 135, upright 119, and/or straps (e.g., first strap 131 or second strap 133) may be similarly sized as one another and/or suitably shaped to facilitate the coupling, engagement, and/or functionality described herein.

Figure 3:
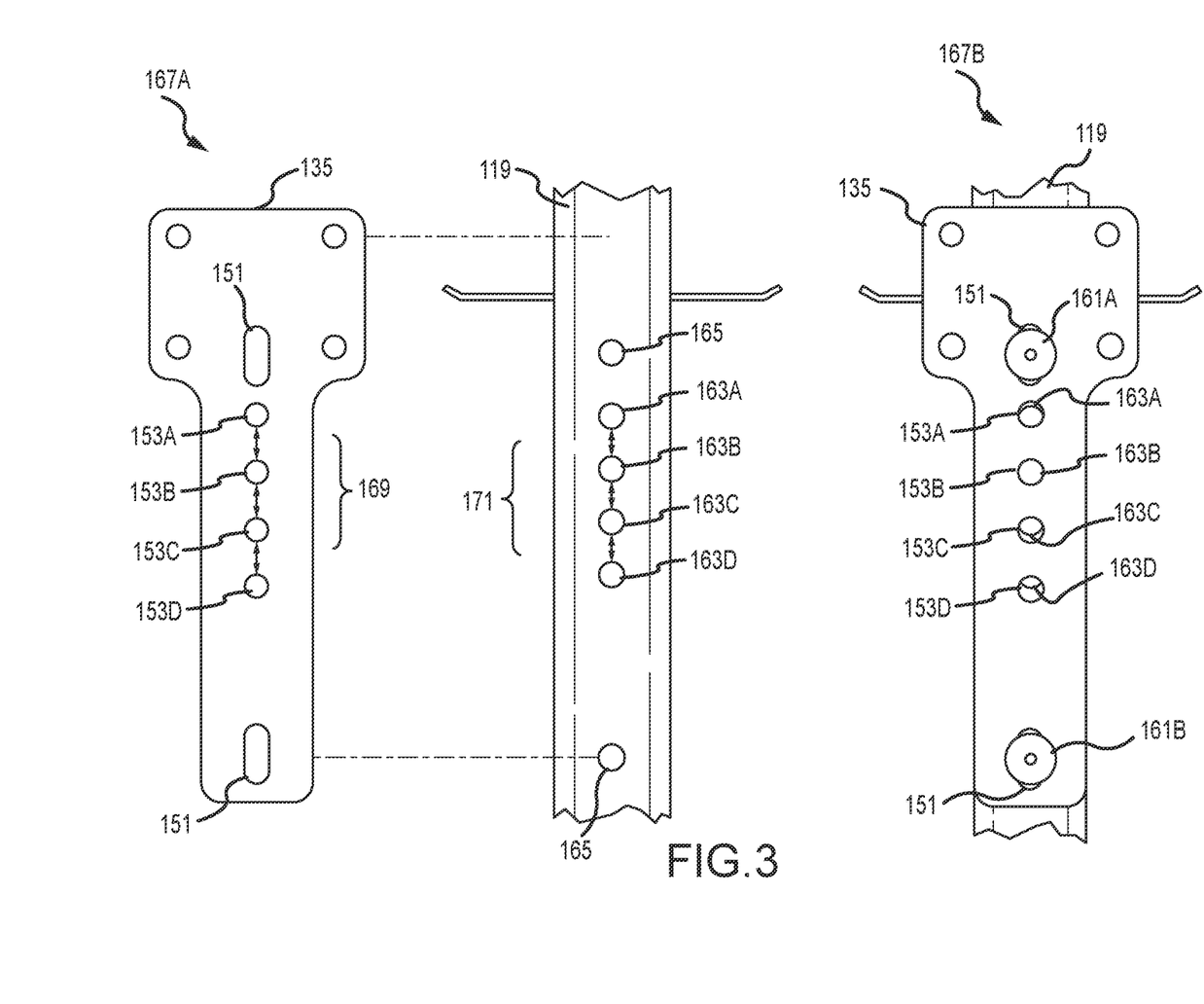
FIG. 3 shows exploded and assembled views of the plate relative to the ladder upright of FIG. 2 in accordance with various embodiments.

FIG. 3 shows an exploded view 167A and an assembled view 167B of the plate 135 relative to the ladder upright 119 according to various embodiments. Features of the plate 135 and the upright 119 may facilitate installation. For example, the positioning apertures 151 of the plate 135 may be brought into alignment with the support apertures 165 of the upright 119. Alignment may allow insertion of the first plate positioning fastener 161A and the second plate positioning fastener 161B through respective pairs of the positioning apertures 151 and the support apertures 165, such as depicted in the assembled view 167B. Such assembly may allow the positioning apertures 151 to be slidable along the plate positioning fasteners 161A/B. Relative shapes may facilitate such sliding. For example, the positioning apertures 151 may be obround, oblong, or otherwise elongate as opposed to symmetrically circular or otherwise fixed size like the support apertures 165. Although elongate shapes are shown on the plate 135 opposite circular shapes on the upright 119, arrangements may be flipped or different, such as with elongate shapes on the upright 119, circular shapes on the plate 135, and/or other relative arrangements that can facilitate the functionality of the components.

The plate positioning fasteners 161A/B may be secured with a suitable tightness or looseness to permit sliding in select situations. For example, the plate positioning fasteners 161A/B may be secured to compress the plate 135 against the ladder upright 119 sufficiently to impart a surface friction between the plate 135 and the ladder upright 119. The friction may be sufficiently high to retain the plate 135 at a vertical position along the ladder upright 119 in an at-rest condition and/or may be sufficiently high to resist and/or prevent downward movement of plate 135 that may be urged by gravity and/or tension in the first strap 131 and/or the second strap 133. In various embodiments, the friction may be at least temporarily overcome to permit movement of the plate 135, such as in response to imparting of a force to push or pull the plate 135 upward and/or downward. The friction may retain the plate 135 in the newly adjusted position. In this manner, the plate positioning fasteners 161A/B may provide a securing to retain an initial position of the plate 135 that may be adjusted by pushing or pulling the plate 135 to another vertical position that may be at least temporarily retained by the plate positioning fasteners 161A/B. For example, the plate positioning fasteners 161A/B may facilitate initial positioning of the plate 135 until a final position of the plate 135 is secured by engagement through the plate-aligning apertures 153 of the plate 135 and the receiving apertures 163 of the ladder upright 119.

The plate-aligning apertures 153 of the plate 135 and the receiving apertures 163 of the ladder upright 119 may be arranged to facilitate interaction between the plate 135 and the ladder upright 119. The plate-aligning apertures 153 of the plate 135 and the receiving apertures 163 of the ladder upright 119 may define corresponding aperture pairs that each include one from the set of receiving apertures 163 and one from the set of plate-aligning apertures 153. For example, as depicted in FIG. 3, a first corresponding aperture pair may include a first plate-aligning aperture 153A and a first receiving aperture 163A, a second corresponding aperture pair may include a second plate-aligning aperture 153B and a second receiving aperture 163B, a third corresponding aperture pair may include a third plate-aligning aperture 153C and a third receiving aperture 163C, and a fourth corresponding aperture pair may include a fourth plate-aligning aperture 153D and a fourth receiving aperture 163D. Although four pairs are specifically depicted, any suitable number of two or more may be utilized.

The plate-aligning apertures 153 and the receiving apertures 163 may be spaced apart from one another differently. For example, the set of receiving apertures 163 may be spaced apart from one another differently than spacing among the plate-aligning apertures 153. In various embodiments, the spacing difference may correspond to a different distribution relating to pitch. For example, the plate-aligning apertures 153 may be separated respectively by a pitch 169, while the receiving apertures 163 may be separated respectively by a pitch 171. The pitch 169 of the plate-aligning apertures 153 and the pitch 171 of the receiving apertures 163 may differ by one of them being constant while the other is variable. As an illustrative example, one set (e.g., the receiving apertures 163) may be separated by distances of 12 mm from each while the other set (e.g., the plate-aligning apertures 153) may be separated by increasing distances such as 12.1 mm, 12.2 mm, 12.3 mm, et cetera. Any suitable distance or distribution may be utilized depending on an adjustability level desired.

In various examples, it may be beneficial to include the constant distribution in the pitch 171 of the receiving apertures 163 and to include the varying distribution in the pitch 169 for the plate-aligning apertures 153. For example, such arrangement may be beneficial as it may be more cost-effective to merely swap out a plate 135 with a different varying pitch 169 if an adjustment in distribution is desired (e.g., since swapping out a small plate 135 may be much less complicated than swapping out an entire ladder upright 119).

As may be seen in the assembled view 167B in FIG. 3, differences in pitch, spacing, and/or style (e.g., between the plate-aligning apertures 153 of the plate 135 and the receiving apertures 163 of the ladder upright 119) may cause corresponding aperture pairs to line up differently such that no more than one pair will line up at a time and/or such that vertically moving the plate 135 will change which of the corresponding aperture pairs is aligned. As a result, the plate 135 may be adjustable by vertical movement along the ladder upright 119 among different aligned configurations. Some examples are shown in FIG. 4.

Figure 4:
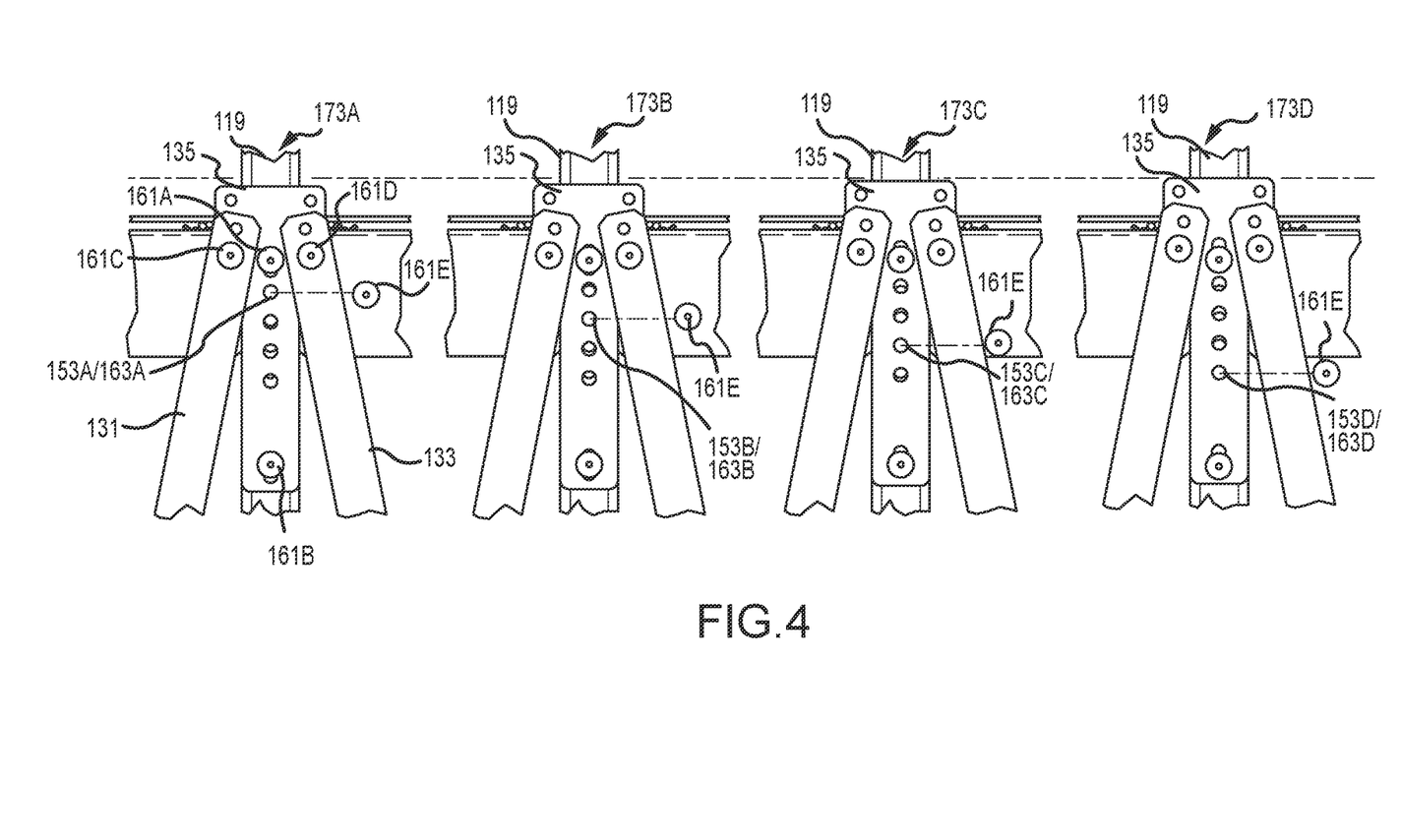
FIG. 4 illustrates examples of different aligned configurations of the plate relative to the ladder upright of FIG. 3, in accordance with various embodiments.

FIG. 4 illustrates examples of different aligned configurations of the plate 135 relative to the ladder upright 119. In a first aligned configuration 173A, the first plate-aligning aperture 153A and the first receiving aperture 163A are shown in an aligned position for receiving the alignment fastener 161E.

The plate 135 may be moved among different vertical positions to adjust amounts of tension in the first strap 131 and the second strap 133. Vertically moving the plate 135 may correspond to moving the plate among different aligned configurations of the pairs of apertures of the plate 135 and the ladder upright 119. The plate 135 may slide along the plate positioning fasteners 161A/161B among vertical positions to reach such aligned configurations, for example. In general, including the plate-aligning apertures 153 and the receiving apertures 163 (e.g., two multi-aperture sets) can allow for a finer resolution of adjustment within a given space than if only a single hole were included in one set to move among discrete positions from multiple holes in a counterpart set.

In a second aligned configuration 173B, the second plate-aligning aperture 153B and the second receiving aperture 163B are shown in an aligned position for receiving the alignment fastener 161E. For example, the plate 135 may move vertically to move from the first configuration 173A to the second configuration 173B.

In a third aligned configuration 173C, the third plate-aligning aperture 153C and the third receiving aperture 163C are shown in an aligned position for receiving the alignment fastener 161E. For example, the plate 135 may move vertically to move from the second configuration 173B to the third configuration 173C.

In a fourth aligned configuration 173D, the fourth plate-aligning aperture 153D and the fourth receiving aperture 163D are shown in an aligned position for receiving the alignment fastener 161E. For example, the plate 135 may move vertically to move from the third configuration 173C to the fourth configuration 173D.

In operation, the plate 135 may be moved upward to whatever position imparts a suitable amount of tension for the first strap 131 and the second strap 133. Such functionality may be capable of accommodating variations in tolerances or dimensions that may occur across a large set of inventory holders 105. For example, a sufficient force to apply suitable tension may raise the plate 135 into one aligned configuration or height for a set of straps of one length, but may raise the plate 135 into a different aligned configuration or height that is a slightly different length (based on differences within production tolerances, for example). The availability of the different configurations can thus allow the alignment fastener 161E to be inserted into whichever corresponding aperture pair is aligned upon application of a suitable tensioning force and can allow an installer to use a single set of pieces to accommodate parts that may be subject to variation across a large set of inventory holders 105.

Figure 5:
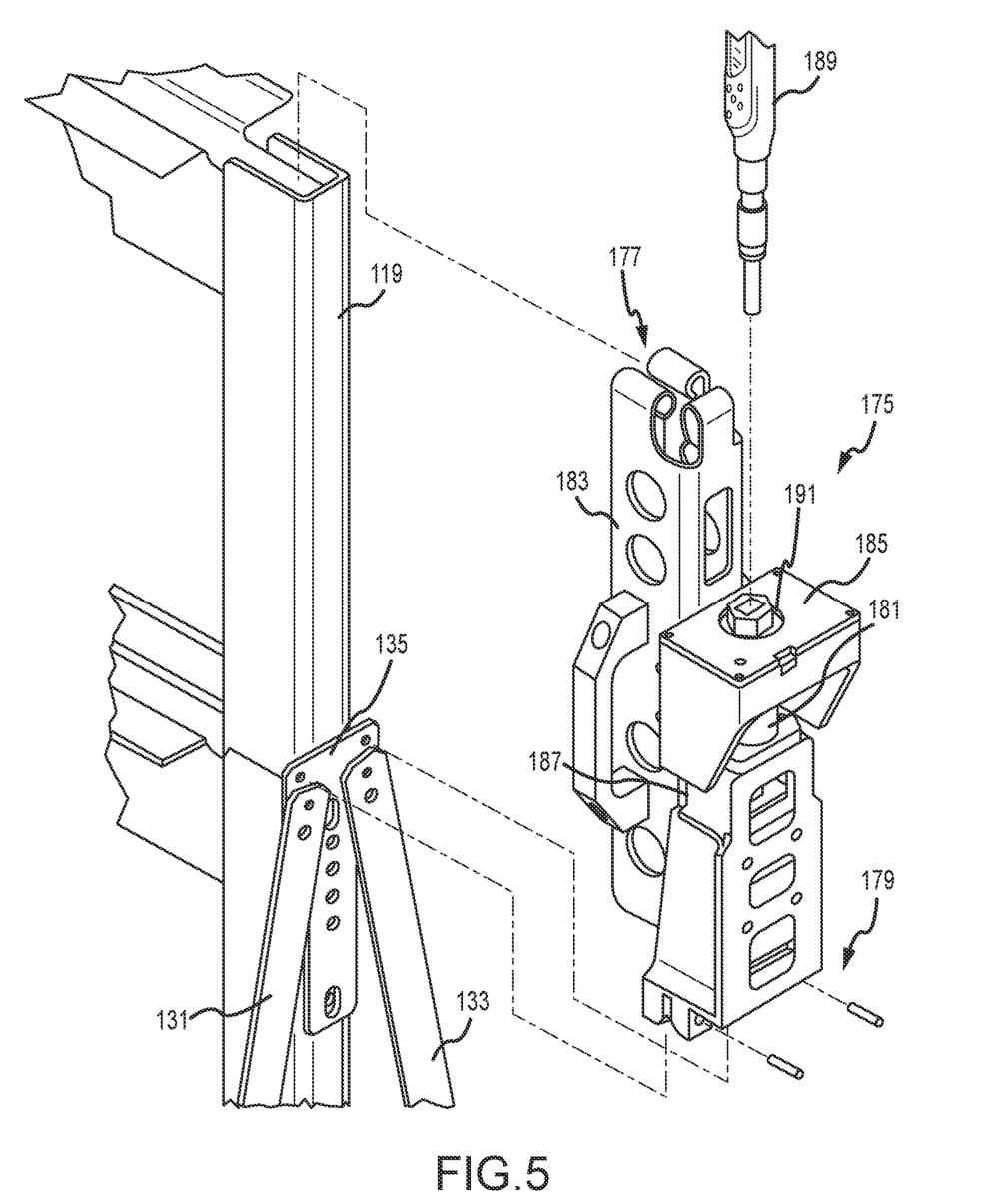
FIG. 5 illustrates an example of a tensioning tool that may be used to adjust a vertical position of the plate of FIG. 3, in accordance with various embodiments.

FIG. 5 illustrates an example of a tensioning tool 175 that may be used to adjust a vertical position of the plate 135. For example, the tensioning tool 175 may adjust a vertical position of the plate 135 to thereby adjust an amount of tension in the first strap 131 and in the second strap 133. The tensioning tool 175 may be utilized to apply a suitable amount of tension so that an installer can insert the alignment fastener 161E into whichever corresponding aperture pair is aligned as a result of the operation of the tensioning tool 175.

The tensioning tool 175 can include a mount 177, a coupler 179, and an actuator 181. In operation, the mount 177 may be engageable with the ladder upright 119 at an installed position of the tensioning tool 175. The mount may secure and/or support the tensioning tool 175 at suitable a suitable position for operation. For example, the mount 177 is shown in FIG. 5 as a set of hooks that may engage with an upper portion of the ladder upright 119 which may correspond to flanges or other features that can receive hooks. Other structure for the mount 177 may additionally or alternatively be utilized to secure the tensioning tool 175 in place relative to the ladder upright 119.

The coupler 179 can include suitable structure to be engageable with the plate 135. The coupler 179 may be engageable with the plate 135 with the mount 177 in the installed position. The coupler 179 is shown with pins that may engage the tool engaging apertures 155 of the plate 135, although any other suitable structure for coupling between the tensioning tool 175 and the plate 135 may be utilized. The coupler 179 is also shown with a slot for receiving the plate 135, for example.

The actuator 181 can include and/or be utilized with a footing 183 and a sled 185. The sled 185 may be movable relative to the footing 183. The sled 185 may be movable along a sliding interface 187, which may include a bearing or other suitable interface along which the sled 185 may be movable relative to the footing 183. For example, the sled 185 may be slidable to move up or down into a position at which the coupler 179 can engage with the plate 135. The actuator 181 may be capable of moving the sled 185 relative to the footing 183, e.g., such that moving the sled 185 when coupled with the plate 135 will also cause movement of the plate 135 along with the sled 185.

The actuator 181 may be drivable to adjust the vertical position of the plate 135 relative to the ladder upright 119. For example, the actuator 181 may be capable of moving the plate 135 when the coupler 179 is in the coupled configuration with the plate 135. The plate 135 may be movable by the actuator 181 when not fully secured to by the alignment fastener 161E to the ladder upright 119, such as when the alignment fastener 161E is out of engagement from the plate-aligning apertures 153, the set of receiving apertures 163, or both. For example, although the alignment fastener 161E is primarily shown and described herein as a structure that can be inserted from outside the ladder upright 119, embodiments may include arrangements in which the alignment fastener 161E is a structure insertable from a rear side of the ladder upright 119 and/or retractable into the ladder upright 119.

The actuator 181 can be drivable by any suitable force-imparting structure. In various examples, the force-imparting structure may include a torque tool 189, such as a torque wrench or a torque screwdriver. In operation, the torque tool 189 can be used to activate the actuator 181 and cause movement of the sled 185 along the footing 183. Activating the actuator 181 may pull the plate 135 upward (in the orientation in FIG. 5), which may in turn impart tension to the first strap 131 and the second strap 133.

The tensioning tool 175 may include the clutch 191, such as a pawl and ratchet or any other suitable structure to prevent the actuator 181 from back-driving upon release or cessation of operation of the torque tool 189.

Generally, the tensioning tool 175 may be utilized to adjust the vertical position of the plate 135 and thereby a tension in the first strap 131 and the second strap 133. In use, the torque tool 189 and/or actuator 181 may be operated to apply a particular amount of force move the plate 135 a suitable amount to reach a suitable amount of tension in the first strap 131 and the second strap 133. Upon operating the actuator 181 to reach a suitable amount of tension, the alignment fastener 161E may be inserted into whichever pair of corresponding aperture pairs is most closely aligned among the receiving apertures 163 and the plate-aligning apertures 153 (e.g., as discussed above with respect to FIG. 4), for example.

Figure 6:
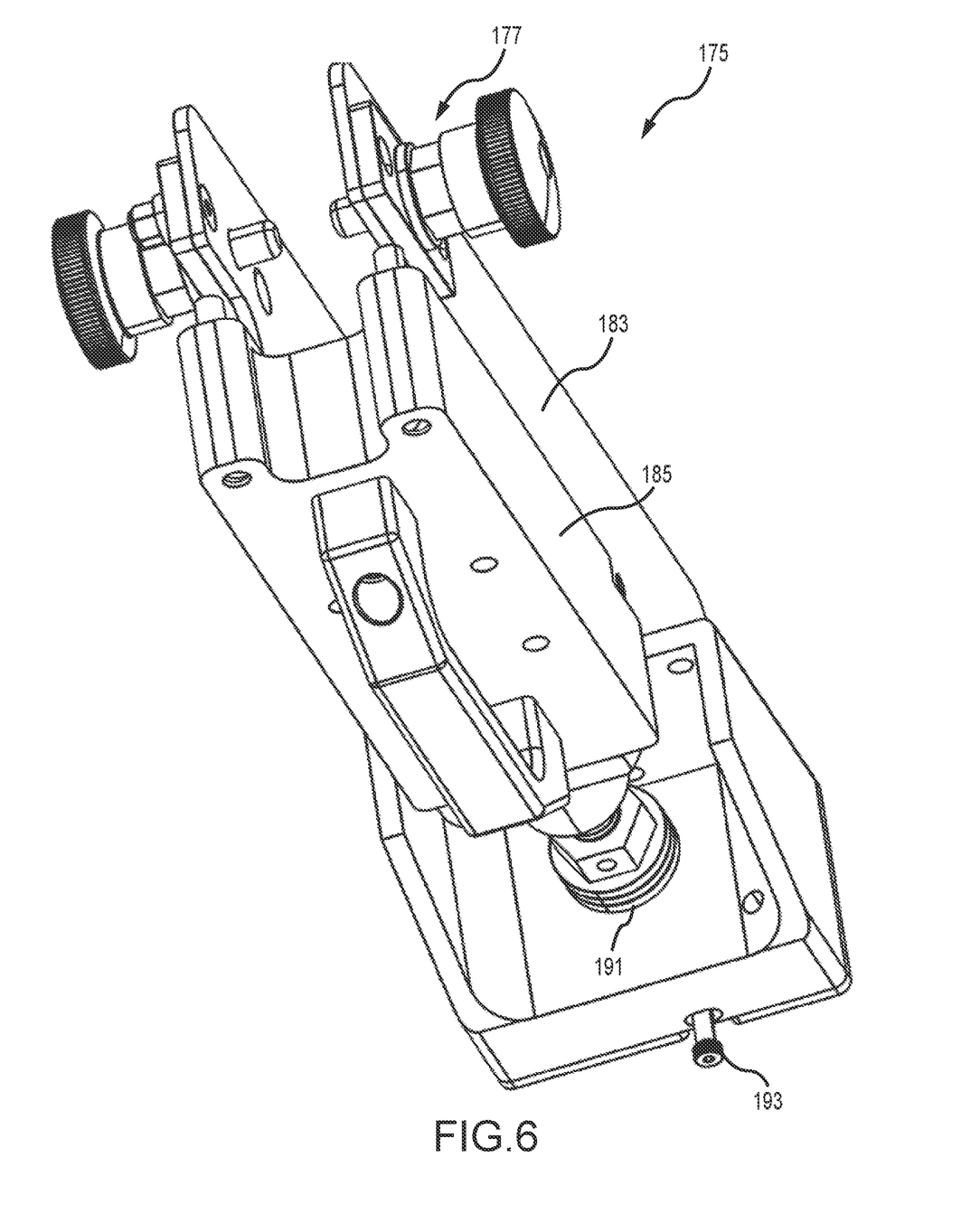
FIG. 6 is a perspective view showing additional features that may be utilized with the tensioning tool of FIG. 5, in accordance with various embodiments.

FIG. 6 is a perspective view showing additional features that maybe utilized with the tensioning tool 175. The mount 177 additionally or alternatively may include one or more retractable pin members that can be engaged in the ladder upright 119 (e.g., along sides of the ladder upright 119 that may extend away from a face in which the receiving apertures 163, support apertures 165, and/or other features may be arranged).

In some embodiments, the tensioning tool 175 may include a release manipulandum 193. The release manipulandum 193 may be capable of releasing the clutch 191 in operation. For example, in use, the release manipulandum 193 may be utilized to release the clutch so that the sled 185 may be moved either up or down. Permitting movement up or down may facilitate aligning of the tensioning tool 175 for engagement with the plate 135 and/or for other suitable positioning of components of the tensioning tool 175.

Figure 7:
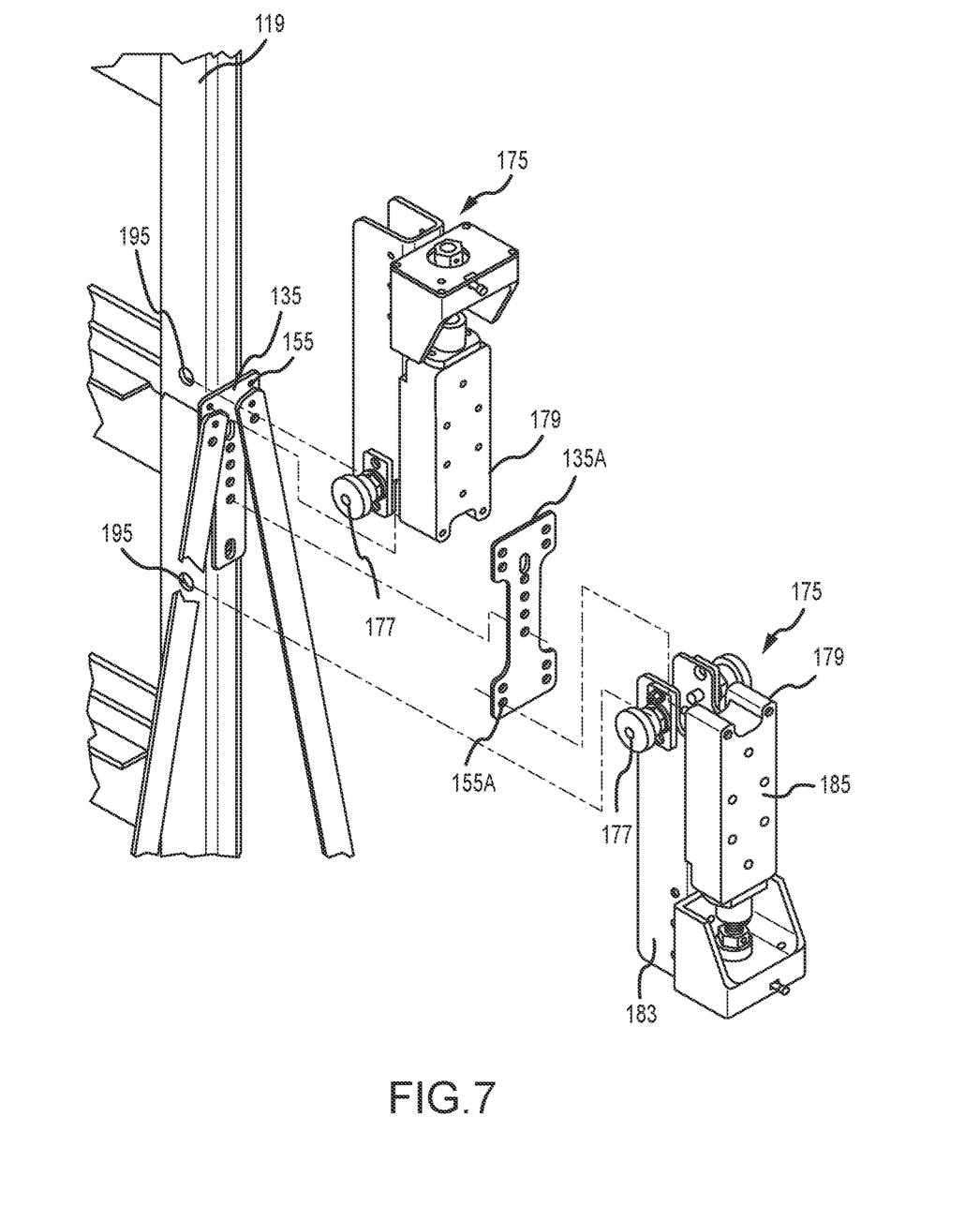
FIG. 7 shows different arrangements or configurations of use of the tensioning tool of FIG. 6, in accordance with various embodiments.

FIG. 7 shows different arrangements or configurations of use of the tensioning tool 175. In operation, the mount 177 may be utilized to engage openings 195 on the ladder upright 119. For example, in the upper portion of the view in FIG. 7, an instance of the tensioning tool 175 may be arranged with the mount 177 disposed downwardly (e.g., positioned to engage openings 195 above the plate 135 along the ladder upright 119 and/or such that the tensioning tool 175 may engage the plate 135 from above and pull the plate 135 upward in order to vertically move the plate 135 upward). The coupler 179 of the tensioning tool 175 may engage the features along the top of the plate 135, such as the tool engagement apertures 155, for example.

Additionally or alternatively, in some arrangements the tensioning tool 175 may be attached by openings 195 that are underneath the plate 135 along the ladder upright 119. For example, at the lower right portion of the view in FIG. 7, the tensioning tool 175 is shown with a mount 177 that is arranged toward the top of the tensioning tool 175. The tensioning tool 175 may be moveable upwardly to cause the coupler 179 to engage along the top of the plate 135 such as in the tool engaging apertures 155 similar to the instance of the tensioning tool 175 shown in an inverted state above. To reach such upper-arranged tool engaging apertures 155, the sled 185 may move upwardly along the footing 183 to bring the coupler 179 into alignment with the tool-engagement apertures 155 along the top of the plate 135.

Additionally or alternatively, a different form factor of plate 135A may be utilized. For example, the plate 135A may include an I shaped form factor instead of a T shape form factor. The plate 135A may include tool engaging apertures 155A that may be positioned along the bottom of the plate 135A, such as along a lower web of the bottom extending lateral wings of the I-shape. Such arrangement may allow the tensioning tool 175 to push the plate 135 upward as opposed to pulling the plate 135 upward as discussed with respect to other arrangements.

Figure 8:
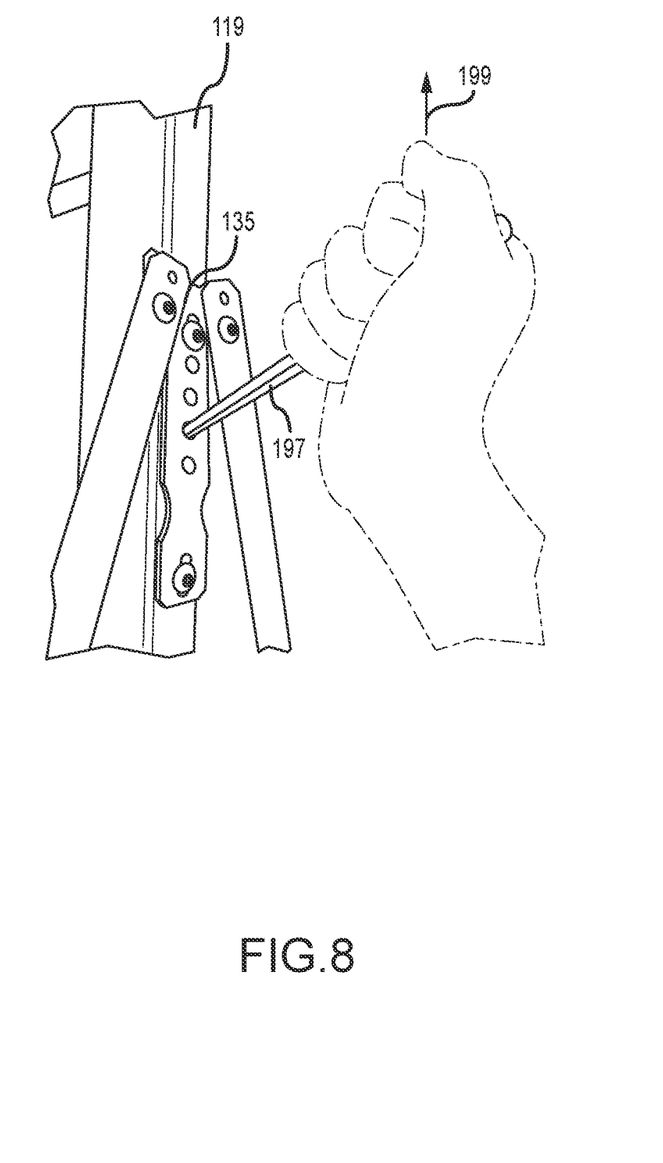
FIG. 8 illustrates a hand tool being used for adjusting a position of the plate relative to the ladder upright of FIG. 3, in accordance with various embodiments.

FIG. 8 illustrates a hand tool 197 being used for adjusting a position of the plate 135 relative to the ladder upright 119. In use, the hand tool 197 may be inserted into the plate-aligning apertures 153 and into the receiving apertures 163 and used in a prying motion (such as by using a lifting force at an opposite end of the hand tool 197, as illustrated by arrow 199). Using the hand tool 197 may allow for an amount of tension to be applied in situations where a small adjustment to the tensioning is desired and/or in an arrangement in which a small adjustment is desirable for causing apertures in the plate 135 and the ladder upright 119 to align.

Figure 9:
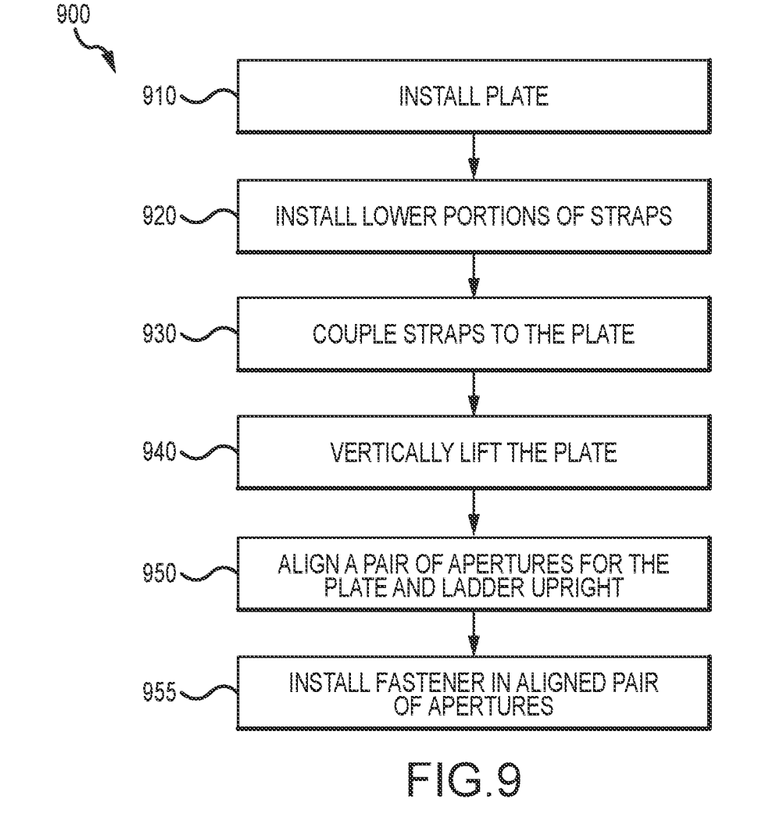
FIG. 9 is a flow diagram that illustrates a process that may be utilized for using a tensioning system herein, in accordance with various embodiments.

FIG. 9 is a flow diagram that illustrates a process 900 that may be utilized for using the tensioning system 103. The process 900 at 910 can include installing a plate (such as plate 135). The plate 135 may be installed relative to the ladder upright 119. For example (as may be most easily seen in FIG. 2), the installation may include aligning one or more positioning apertures 151 of the plate 135 with one or more support apertures 165 of the ladder upright 119. The installation can further include inserting a first plate positioning fastener 161A and/or a second plate positioning fastener 161B through one or more respective positioning apertures 151 in the plate 135 and into the support apertures 165 of the ladder upright 119. The plate positioning fasteners 161A and/or 161B may be secured at a suitable tightness to allow the plate to slide along the interface of the positioning aperture 151 and the plate positioning fastener 161A/161B.

At 920, the process 900 can include installing lower strap portions. For example (as may be most easily seen in FIG. 1), this can include coupling the first lower anchor portion 139 along the first lateral area 115 of the base 109 such as by insertion of a rivet or other suitable fastening technique. Additionally or alternatively, the act at 920 can include coupling the second lower anchor portion 145 along the second lateral area 117 of the base 109 such as by insertion of a rivet or other fastening technique. In various embodiments, installing lower portions of the first strap 131 and the second strap 133 can allow upper extremities of to be pivoted or otherwise adjusted to be positioned proximate the plate 135.

At 930, the process 900 can include coupling straps to the plate. This can include coupling the first upper anchor portion 137 and/or the second upper anchor portion 143 with the plate 135. For example (as may be most easily seen in FIG. 2), a first strap attaching fastener 161C may be extended through the first upper anchor portion 137 of the first strap 131 and into the first strap engaging aperture 157 of the plate 135. Similarly, attaching the second strap 133 may include extending a second strap attaching fastener 161D through the second upper anchor portion 143 of the second strap 133 and through the second strap engaging aperture 159.

At 940, the process 900 can include vertically lifting the plate. For example, this may correspond to using the tensioning tool 175 (e.g., FIGS. 5, 6, and/or 7) to lift the plate 135 (such as following installation of the tensioning tool 175 as discussed with respect to FIG. 10). Additionally or alternatively, vertically lifting the plate 135 at 940 may correspond to using a hand tool 197, such as discussed with respect to FIG. 8.

At 950, the process 900 can include aligning a pair of apertures for the plate and ladder upright. For example, this may correspond to the alignment of respective corresponding pairs in one or more of the positions shown in FIG. 4 for example. In some embodiments, the alignment may result from operation of the tensioning tool 175, for example. In some embodiments, the alignment may result from operation of the hand tool 197, such as in lieu of the tensioning tool 175 or if added lifting is desired to provide additional alignment beyond an amount provided by operation of the tensioning tool 175. Any pair of the apertures may be aligned as a result of the operation at 950, e.g., depending on the tolerances present or differing among different assemblies.

At 955, the process 900 can include installing a fastener in an aligned pair of apertures. For example (as may be best seen in FIG. 4), this may correspond to installing an alignment fastener 161E in a pair of aligned apertures from among the plate-aligning apertures 153 and the receiving apertures 163 to secure the plate 135 in a position in which the tension is maintained in the first strap 131 and the second strap 133.

Figure 10:
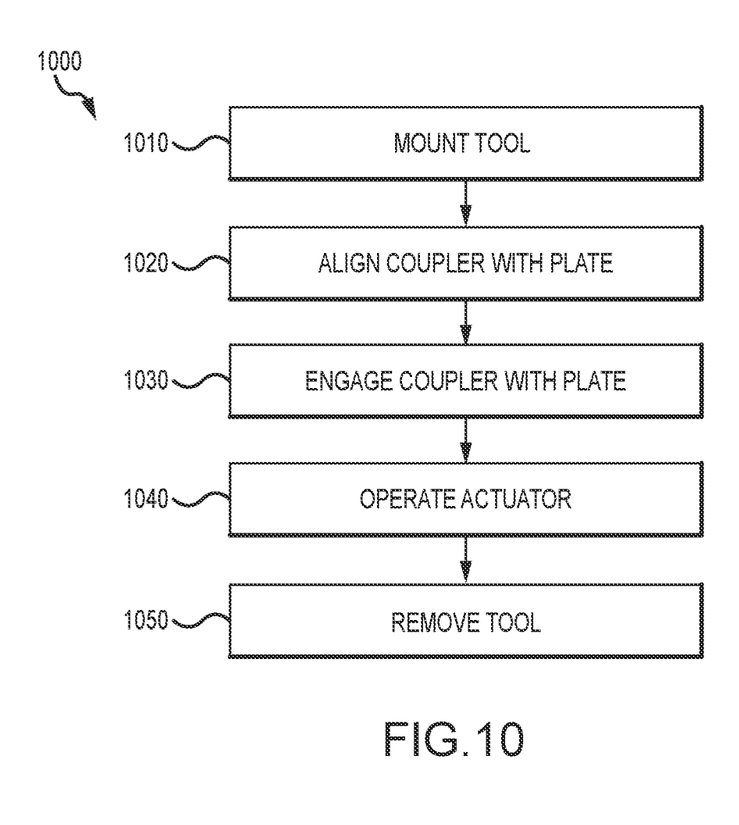
FIG. 10 is a flowchart illustrating a process for use of a tensioning tool, in accordance with various embodiments.

FIG. 10 is a flowchart illustrating a process 1000 for use of a tensioning tool. At 1010, the process can include mounting a tool. For example, this can correspond to using the mount 177 of the tensioning tool 175 to engage the ladder upright 119, such as by hooks (e.g., FIG. 5) and/or by pins engaging openings 195 (e.g., FIG. 7).

At 1020, the process 1000 can include aligning a coupler with the plate. For example, this may correspond to moving the sled 185 (e.g., FIG. 5 or 7) up or down to a suitable position for engaging the plate 135 with the coupler 179, such as at a suitable position for engaging with the tool engaging apertures 155 or 155A. In some embodiments, the act at 1020 can be preceded by operation of the release manipulandum 193 to release the clutch 191 and enable up and down movement of the sled 185 suitable for aligning the coupler with the plate 135.

The process 1000 at 1030 can include engaging a coupler with the plate. This can include the coupler 179 using pins, slots, and/or other structure to engage the plate 135 (e.g., such as in the tool engaging apertures 155 shown in FIG. 2). In some embodiments, engaging the coupler 179 may further include and/or be supplemented by operation of the release manipulandum 193 to engage the clutch 191 in preparation for subsequent actions in the 1000.

The process 1000 at 1040 can include operating an actuator. For example (as may be most easily seen in FIG. 5), this can include using the torque tool 189 or other techniques to operate the actuator 181 to cause the sled 185 to move along the footing 183 upward to push or pull the plate 135 upward and impart tension into the first strap 131 or the second strap 133. In various embodiments, the actuator 181 can be operated until a suitable pair of openings (e.g., a pair that includes a plate-aligning aperture 153 and a receiving aperture 163) is aligned in a suitable position for receiving the alignment fastener 161E therethrough to secure the plate 135 in position. In some examples, the actuator 181 can be operated until a suitable amount of torque (e.g., a predetermined amount) is indicated by the torque tool 189. A suitable amount of torque applied that may be commensurate with achieving a suitable amount of tension in some embodiments may be 70-80 Newton Centimeters (N*cm), although other values may be utilized. In some embodiments, if application of a predetermined amount of torque does not cause one of the aperture pairs to align, a further quarter turn or other amount of operation of the torque tool 189 may be applied to impart additional vertical movement to the plate 135 to facilitate further alignment and/or the hand tool 197 may be utilized to impart additional vertical movement to the plate 135 to facilitate further alignment.

The process 1000 at 1050 can include removing the tool. This can include removing the tensioning tool 175, such as by unmounting the tensioning tool 175 via the mount 177. For example, a hook (e.g., FIG. 5) may be lifted out of engagement and/or pins (e.g., FIG. 6) may be retracted to facilitate unmounting and/or removal. The act at 1050 can occur after the alignment fastener 161E is installed in an aligned pair of apertures at 955, e.g., since this may correspond to tension state having been secured such that further action by the tensioning tool 175 is unnecessary. The act at 1050 may allow the tensioning tool 175 to be readily used in with a different inventory holder 105 (e.g., which may allow cost savings from not having each inventory holder 105 have its own tensioning tool 175).

In some embodiments, various portions of the processes 900 and 1000 may be performed in repeated or iterative approaches. For example, in some embodiments, the first and the second straps may correspond to upper first and second straps and parts of the process may be performed relative to a lower set that may include first and second lower straps (such as shown in FIG. 1). In some embodiments, the upper straps may be tensioned using a tensioning tool 175, and the lower straps may be tensioned using a hand tool such as 197. In some embodiments, applying tension to the upper straps is suitable for stabilizing the inventory holder 105, and the lower straps can be set or secured at a state with minimal tension (e.g., so as to not pull on the base 109 in a way that could diminish the tension previously imparted in the upper straps). To this end, the hand tool 197 may be suitable for adjusting the lower straps where the tensioning tool 175 may be more suitable for applying a larger amount of tension or a more precise predetermined amount of tension to the upper set of straps. In some aspects, using the hand tool 197 may be an action that is performed prior to implementing the tensioning tool 175 such as for initially positioning the plate 135 in a suitable position for engagement by the tensioning tool 175.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An inventory management system, comprising:
   a mobile drive unit operable to move and carry within a workspace;
   a rack comprising:
      a base having a bottom surface engageable by the mobile drive unit, the base comprising at least a central area between a first lateral area and a second lateral area;

a ladder upright anchored in the central area and extending upwardly from the base;

a plurality of shelves arranged above the base, supported by the ladder upright, and extending laterally from the ladder upright; and a set of legs extending downwardly from the base and spaced apart from one another to facilitate passage of the mobile drive unit between at least some of the legs to reach a position beneath the base for engagement with the bottom surface of the base to lift the rack for transport within the workspace; and a tensioning system comprising:

a first strap anchored at the first lateral area of the base and extending upward toward a first upper anchor portion;

a second strap anchored at the second lateral area of the base and extending toward a second upper anchor portion;

a plate secured to the first upper anchor portion of the first strap and secured to the second upper anchor portion of the second strap, the plate further comprising a set of plate-aligning apertures vertically aligned along the plate and including at least a first plate-aligning aperture and a second plate-aligning aperture;

a set of receiving apertures vertically arranged along the ladder upright and including at least a first receiving aperture and a second receiving aperture, the set of receiving apertures spaced apart from one another differently than a spacing among the plate-aligning apertures such that the plate is adjustable by vertical movement along the ladder upright among at least (i) a first aligned configuration in which the first plate-aligning aperture is aligned with the first receiving aperture, and (ii) a second aligned configuration in which the second plate-aligning aperture is aligned with the second receiving aperture; and a fastener arranged extending through either (i) the first plate-aligning aperture and the first receiving aperture in the first aligned configuration, or (ii) the second plate-aligning aperture and the second receiving aperture in the second aligned configuration.

2. The inventory management system of claim 1, wherein the fastener is arranged to retain the tensioning system in a state in which tension is maintained in the first strap and in the second strap.

3. The inventory management system of claim 2, wherein the fastener is arranged so that the tension maintained in the first strap and in the second strap is in an amount or range selected to (a) mitigate against oscillation of the ladder upright relative to the base in a state of being lifted by the mobile drive unit, and (b) avoid pulling the base away from a substantially flat orientation suitable for engagement by the mobile drive unit.

4. The inventory management system of claim 1, wherein the tensioning system further comprises a tensioning tool, the tensioning tool comprising:

a mount engageable with the ladder upright at an installed position;

a coupler engageable with the plate in a coupled configuration with the mount in the installed position; and an actuator drivable to adjust a vertical position of the plate relative to the ladder upright with the coupler in the coupled configuration and with the fastener out of engagement from the set of plate-aligning apertures, the set of receiving apertures, or both.

5. A tensioning system configured for use with a rack that includes (i) a base with a central area between a first lateral area and a second lateral area, (ii) a ladder upright anchorable in the central area so as to extend upwardly from the base, and (iii) a plurality of shelves supportable by the ladder upright, the tensioning system comprising:

a first strap comprising at least a first upper anchor portion, a first lower anchor portion, and a first elongate body portion extending therebetween, wherein the first lower anchor portion is coupleable with the first lateral area of the base of the rack;

a second strap comprising at least a second upper anchor portion, a second lower anchor portion, and a second elongate body portion extending therebetween, wherein the second lower anchor portion is coupleable with the second lateral area of the base of the rack; and a plate coupleable with the first upper anchor portion and the second upper anchor portion, the plate comprising a set of plate-aligning apertures vertically arranged along the plate and configured for installation along a set of receiving apertures vertically arranged along the ladder upright so as to define corresponding aperture pairs that each include one from the set of receiving apertures and one from the set of plate-aligning apertures, the set of plate-aligning apertures being distributed differently from the set of receiving apertures such that the plate is vertically moveable along the set of receiving apertures to change which of the corresponding aperture pairs is aligned.

6. The tensioning system of claim 5, wherein the plate is vertically moveable along the set of receiving apertures to change which of the corresponding aperture pairs is aligned in a configuration to receive a fastener therethrough for retaining tension in the first strap and the second strap in an installed state.

7. The tensioning system of claim 6, further comprising the fastener.

8. The tensioning system of claim 5, wherein the set of plate-aligning apertures being distributed differently from the set of receiving apertures comprises one of the sets having apertures separated by a constant pitch and the other of the sets having apertures separated by a varied pitch.

9. The tensioning system of claim 5, wherein the plate further comprises at least one positioning aperture having an elongate shape sized for sliding along a positioning fastener.

10. The tensioning system of claim 9, further comprising the positioning fastener, and wherein the positioning fastener is installable to compress the plate against the ladder upright to impart sufficient friction between the plate and the ladder upright to resist downward movement of the plate urged by gravity and tension in the first strap and second strap in an installed state.

11. The tensioning system of claim 5, further comprising the rack.

12. A method of adjusting tension on a rack of an inventory storage system, the method comprising:

accessing a plate installed along a ladder upright of the rack such that plate-aligning apertures vertically aligned along the plate are arranged along a set of receiving apertures vertically arranged along the ladder upright so as to define corresponding aperture pairs that each include one from the set of receiving apertures and one from the set of plate-aligning apertures;

vertically lifting the plate upward to increase an amount of tension in a pair of straps extending downwardly from the plate to a base of the rack; and inserting a fastener into an aligned aperture pair to secure the plate in a state in which tension is present in the pair of straps.

13. The method of claim 12, further comprising installing the plate along the ladder upright.

14. The method of claim 13, wherein installing the plate comprises inserting a positioning fastener through an elongate aperture of the plate so that the plate is slidable along the positioning fastener.

15. The method of claim 12, further comprising coupling the straps with the plate.

16. The method of claim 12, further comprising coupling the straps with the base.

17. The method of claim 12, wherein vertically lifting the plate upward comprises lifting the plate by a tensioning tool.

18. The method of claim 17, wherein lifting the plate by the tensioning tool comprises lifting by a tensioning tool mounted on the rack.

19. The method of claim 18, further comprising applying a predetermined amount of torque to the tensioning tool to lift the plate.

20. The method of claim 18, further comprising removing the tensioning tool from the rack; and installing the tensioning tool on another rack for vertical movement of another plate thereon.

\* \* \* \* \*